(12) United States Patent
Ginter

(10) Patent No.: US 12,261,979 B1
(45) Date of Patent: Mar. 25, 2025

(54) METHODS FOR ENHANCED DYNAMIC LOCATION ROUTING AND RELATED SYSTEMS

(71) Applicant: Bandwidth Inc., Raleigh, NC (US)

(72) Inventor: Thomas Ginter, Allen, TX (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 18/642,972

(22) Filed: Apr. 23, 2024

(51) Int. Cl.
| | | |
|---|---|---|
| H04W 4/00 | (2018.01) | |
| H04L 65/1104 | (2022.01) | |
| H04M 3/51 | (2006.01) | |
| H04M 7/00 | (2006.01) | |
| H04W 76/50 | (2018.01) | |

(52) U.S. Cl.
CPC ....... *H04M 3/5116* (2013.01); *H04L 65/1104* (2022.05); *H04M 7/006* (2013.01); *H04M 2242/04* (2013.01); *H04M 2242/30* (2013.01); *H04W 76/50* (2018.02)

(58) Field of Classification Search
CPC .... H04W 76/50; H04M 3/5116; H04M 7/006; H04M 2242/04
See application file for complete search history.

(56) References Cited

U.S. PATENT DOCUMENTS

| | | | | |
|---|---|---|---|---|
| 2007/0060097 | A1* | 3/2007 | Edge | H04M 11/04 455/404.1 |
| 2008/0063153 | A1* | 3/2008 | Krivorot | H04M 11/04 379/45 |

* cited by examiner

*Primary Examiner* — Omoniyi Obayanju
(74) *Attorney, Agent, or Firm* — Elizabeth Stanek; Gregory Stephens

(57) ABSTRACT

Methods for Enhanced Dynamic Emergency Location Routing (E-DLR) are provided. The method includes receiving a Voice over Internet Protocol (VOIP) emergency call from a roaming emergency caller associated with a first country having an associated telephone number (TN) and an associated address, the VoIP emergency call being made in a second country, different from the first country. It is determined that the associated address is a shared address based on information in a geolocation record. The shared address is not a home address associated with the roaming emergency caller. The emergency call is routed from the roaming emergency caller to a public safety answering point (PSAP) associated with the second country using the proxy TN associated with the shared address.

18 Claims, 9 Drawing Sheets

METHODS FOR ENHANCED DYNAMIC LOCATION ROUTING AND RELATED SYSTEMS

FIELD

The present inventive concept generally relates to emergency calls and, more particularly, to enhanced emergency calling or "E911" for Voice over Internet Protocol (VOIP) Systems while a user is roaming.

BACKGROUND

911 Emergency calls are, by definition, time sensitive and may be a matter of life or death. The 911 operator (911 call taker or public safety personnel) must be able to communicate with the 911 caller, know exactly where the 911 caller is physically located and be able to call the 911 caller back if the call is disconnected for any reason. An increasing number of users (callers) are using Voice over Internet Protocol (VOIP) platforms, rather than legacy plain old telephone service (POTS) to make telephone calls. To provide customary 911 calling service to a call made using a VOIP platform, the platform needs to send the emergency call to a 911 Access service, for example, services provided by a carrier, such as Bandwidth. The emergency call is generally sent in the form of a Session Initiation Protocol (SIP) INVITE that identifies the called party as "911" (in the United States) and the calling party as a unique, for example, North American Numbering Plan (NANP) telephone number (TN). The 911 service provider (for example, Bandwidth) processes this call by fetching the pre-stored address associated with the unique calling party TN and using that address data to route the call to the correct destination Public Safety Answering Point (PSAP). Other countries also have similar VOIP emergency systems, for example, in Europe the emergency services number is "112."

Across the globe when a Carrier provides VOIP voice services, there is a general requirement to also provide emergency calling in each nation in which telephony services are provided. However, there is a marked disparity in the ease-of-use and flexibility of emergency services supported in many countries due to fundamental restrictions in the underlying infrastructure that supports emergency calling.

In particular, on one end of the spectrum is the United States with a mature and nationwide ability to support VOIP Position Center (VPC) protocols. A full description of VPC services and protocols are founding in the NENA 008-001 public standard "Interim VoIP Architecture for Enhanced 9-1-1 Services (i2)." In the United States, VOIP customers can perform 911 calls from fully nomadic VOIP devices where the emergency call is "location-correct" while moving from place to place, city to city and state to state. In stark contrast, Austria has no national database for the storage of emergency address data and, thus, VOIP Carriers and International (INTL) VOIP Carriers (e.g. Bandwidth), must manage address data in a cumbersome fashion.

Many countries lack infrastructure and do not provide a provisioned national Automatic Location Identification (ALI) database including current location information. The problem is illustrated by the following example. For a United States-based VOIP device with a United States TN, when it roams to a foreign nation, e.g. Germany in Europe, even if the VOIP device can attach to a VOIP network, because there is no VPC in the country, the only way to pass an address to the PSAP during an emergency call is to pre-provision that address in the local ALI database (which is exactly what happens for wireline calls in the United States). However, since the United States telephone number is incompatible and cannot be loaded into the German ALI, there is currently no way to associate a German (foreign) address with the United States TN for use during an emergency call while roaming. Accordingly, improved methods of providing emergency services to a roaming caller are desired.

SUMMARY

Some embodiments of the present inventive concept provide methods for Enhanced Dynamic Emergency Location Routing (E-DLR). The method includes receiving a Voice over Internet Protocol (VOIP) emergency call from a roaming emergency caller associated with a first country having an associated telephone number (TN) and an associated address, the VoIP emergency call being made in a second country, different from the first country. It is determined that the associated address is a shared address based on information in a geolocation record. The shared address is not a home address associated with the roaming emergency caller. The emergency call is routed from the roaming emergency caller to a public safety answering point (PSAP) associated with the second country using the proxy TN associated with the shared address.

Related systems and computer program products are provided.

DETAILED DESCRIPTION OF EMBODIMENTS

Figure 1:
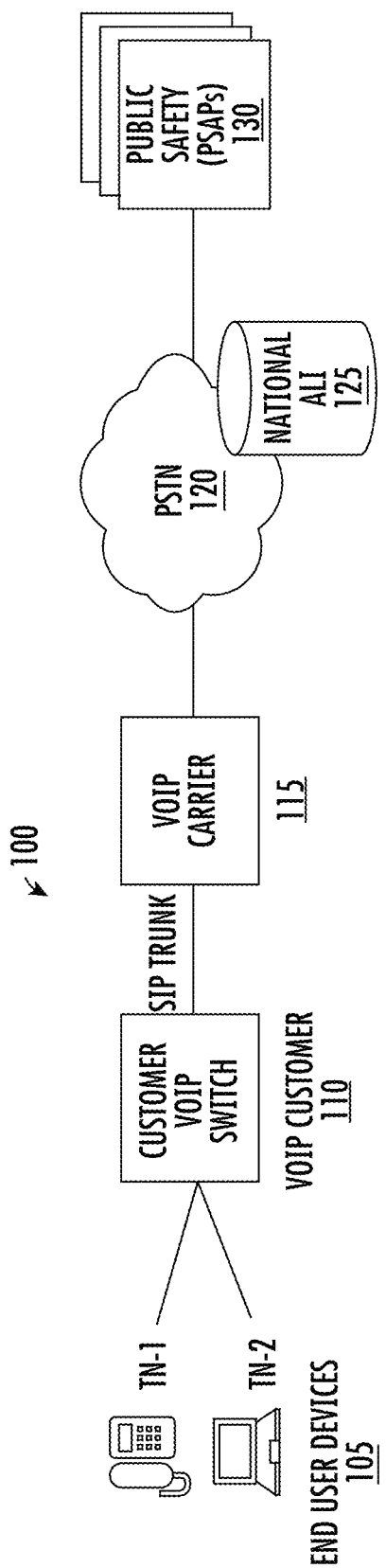
FIG. 1 is a basic block diagram illustrating a VoIP 911 call made from a non-roaming device in the United States.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

It will be understood that the use of the term telephone number or "TN" herein refers to in this a E.164 compliant telephone number including designated country code.

When a voice over internet protocol (VOIP) 911 call is made from a device having an associated US telephone number, the system can function and the 911 operator is presented with the call back number of the caller and the physical address of the 911 caller. However, this call flow is compromised when the device used by the 911 caller is "roaming" and the user is, therefore, a "roaming caller/user." As used herein, "roaming" refers to a situation when the caller is using the phone outside of a specified coverage area. Thus, a "roaming caller" is a user using the VOIP phone outside of their specified coverage area.

Currently, when, for example, a United States-based VOIP user is roaming and takes their device to a foreign country, for example, Germany, and dials "911," the 911 call will be routed back across the internet to the United States where the 911 address of the user has been provisioned and the emergency call will be routed to the public safety answering point (PSAP) serving that provisioned address despite the actual physical location of the roaming caller in Germany.

Accordingly, some embodiments of the present inventive concept provide enhanced dynamic location routing (E-DLR). E-DLR provides a user of a VOIP telephone from a first country the ability to roam in a second country and complete an emergency call that is correctly routed in the second country. For example, a United States VOIP telephone user is able to roam to a foreign country and make an emergency call that will be correctly routed in that foreign country. In some embodiments, the inventive concept will display the current location of the roaming caller/user and allow for a dropped emergency call in the second (foreign) country to be able to be correctly connected back to the roaming user. Embodiments of the present inventive concept may operate despite the lack of VOIP Position Center (VPC) technology in the second (foreign) country, which is supported universally in the United States, and relies solely on the presence of a legacy wireline automatic location identification (ALI) database in the second (foreign) nation. It will be understood that embodiments of the present inventive concept are not limited to United States VOIP users roaming in foreign countries. In particular, embodiments of the present inventive concept allow a foreign VOIP user with a foreign telephone number (FTN) to roam into the United States and make correct emergency calls with a correct United States address being used to route the call and have that address displayed to the Public Safety Answering Point (PSAP). Similarly, embodiments of the present inventive concept may also be used for foreign-to-foreign roaming without departing from the scope of the present inventive concept. Details of embodiments of the present inventive concept will be discussed below with reference to the figures.

As used herein, a "VOIP Customer" refers to a customer, such as an enterprise, that purchases VOIP telecommunications services such as session initiation protocol (SIP) Trunks, in-bound telephone number (TN) services, out-bound calling services and emergency calling services from a VOIP Carrier. A "Customer VOIP Switch" refers to an on-premises or cloud-based VOIP switching infrastructure that supports a VOIP Customers internal calling as well as external services to a VOIP Carrier. This equipment may be commonly referred to as a Private Branch Exchange (PBX) or Multi-Line Telephone System (MLTS). A "VOIP Carrier" refers to a VOIP service provider that can deliver VOIP telecommunications services such as SIP Trunks, in-bound TN services, out-bound calling services and emergency calling services within the footprint of a local area (such as a LATA in the United States) or on a national level (such as for all of Canada), but not on an international basis. Finally, an "INTL VOIP Carrier" refers to an international VOIP service provider that can deliver VOIP telecommunications services such as SIP Trunks, in-bound TN services, out-bound calling services and emergency calling services for a plurality of nations.

Referring first to FIG. 1, a conventional system 100 will be discussed. As illustrated in FIG. 1, the system 100 includes one or more end user devices 105, a customer VOIP switch 110, a VOIP carrier 115, a public switched telephone network (PSTN) 120 with an associated ALI database 125 and one or more PSAPs 130. It will be understood that FIG. 1 is provided as an example only and embodiments of the present inventive concept are not limited thereto.

As illustrated in FIG. 1, a call is made from an end user device 105. The end user devices 105 may be, for example, a personal computer (PC), a mobile device such as smartphone, laptop, VoIP phone, IoT device, or another telephonic device. These devices are VOIP devices and communicate over a VoIP network. The VoIP network may be provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the public switched telephone network (PSTN). The PSTN network is an aggregate of the world's circuit-switched telephone networks that are operated by national, regional, or local telephone operators, providing infrastructure and services for public telecommunication. The network discussed herein may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

Figure 2:
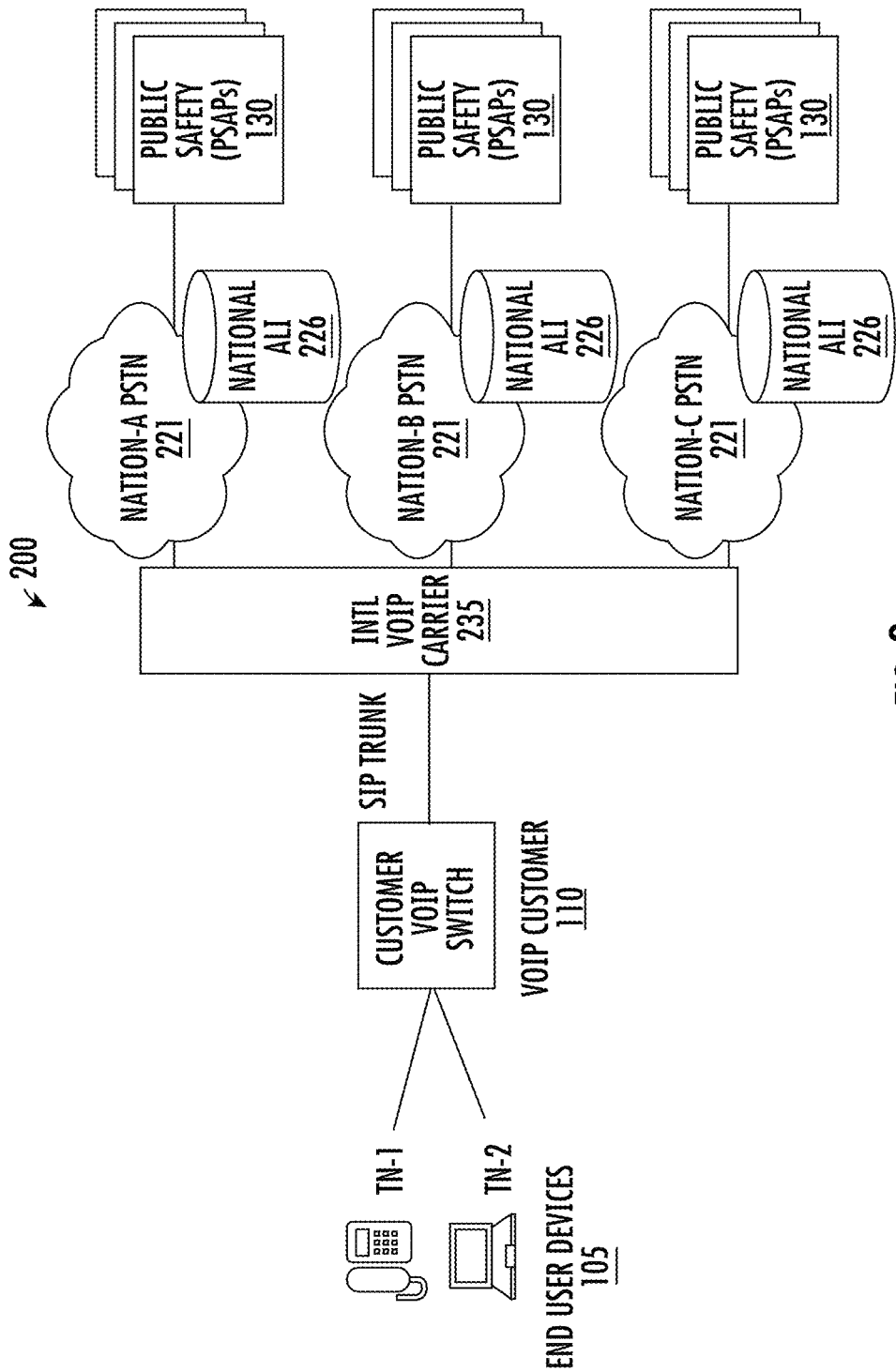
FIG. 2 is a block diagram illustrating a VOIP 911 call made from a non-roaming device in a foreign country.

Referring again to FIG. 1, a user initiates a call from an end user device 105 having a telephone number (TN) associated therewith (e.g. TN-1 or TN-2). The call is sent in the form of a SIP invite including a TN (TN-1 and TN-2). The SIP invite is sent to and received by a Customer VOIP Switch 110. The call is routed through a customer VOIP switch 110 which passes the call to the VOIP Carrier 115. The call is communicated through the PSTN 120 which looks up the caller's location information in the ALI database 125. It will be understood that the ALI database 125 must be pre-provisioned with the location information. Details of provisioning will be discussed below. The location information found in the ALI database 125 is passed to the PSAP 130 so that the PSAP 130 dispatches emergency services to the proper location. FIG. 2 illustrates a similar system 200 to the system 100 in FIG. 1. However, the system of FIG. 2 is for use in international systems. In particular, the system 200 of FIG. 2 includes an international VOIP carrier 235 and National PSTNs 221 and associated ALI databases 226.

As discussed above, embodiments of the present inventive concept provide E-DLR where roaming is available to a user in a first country when the user is in the second country and the user's location for emergency services will be accurately provided in the second country. It will be understood that the concepts that underlie E-DLR have existed in the industry for many years. These techniques have typically been deployed on a local basis only (non-roaming basis). For example, this method has been used within a single building or complex of buildings to automate emergency calling when phones are unplugged from one location and plugged back in again elsewhere. Details of this process are discussed, for example, in commonly assigned, U.S. patent application Ser. No. 17/329,598, now U.S. Pat. No. 11,159,676, the disclosure of which is hereby incorporated herein by reference as if set forth in its entirety. A explanation of the enhanced emergency location identification number (ELIN)/emergency response location (ERL) technique will be briefly discussed below for context.

The most common Multiline Telephone System "MLTS" feature used to manage emergency calls (both 911 (US) and 112 (Europe)) is ELIN/ERL. It will be understood that MLTS is interchangeable with the term "PBX." Examples of MLTS systems that use ELIN/ERL include Cisco UCM, Avaya, ShorTel/MiTel, and the like.

Although many of the examples discussed herein refer to "911" as the emergency telephone number, it will be understood that embodiments discussed herein may be applied to any emergency telephone number, such as 911, 112, 999, etc., without departing from the scope of the present inventive concept. The ELIN/ERL feature used by MLTS systems generally accomplishes two main objectives: (1) it allows phones to be moved without needing to re-provision 911 addresses; and (2) it reduces overall costs associated with emergency 911 service. With the number of people working from home significantly increasing over the past years due, in part, to the COVID pandemic, pinpointing the correct location (physical address) of a 911 emergency caller has become more difficult. For example, the relocation of office equipment from the physical location of the business enterprise to a home office complicates providing the correct physical location of the 911 emergency caller to the 911 operator (public safety). People also physically move devices/phones from office to office and building to building. Each time a device/phone is moved and plugged into the network at a different location, the 911 address of device/phone needs to be adjusted, for example, the specific floor-level or room-level. The ELIN/ERL feature automatically "tracks" the device/phones movements. Thus, the old address of the device is replaced with the new address during an actual emergency call despite movement of the device within the business premises as will be discussed below.

Figure 3A:
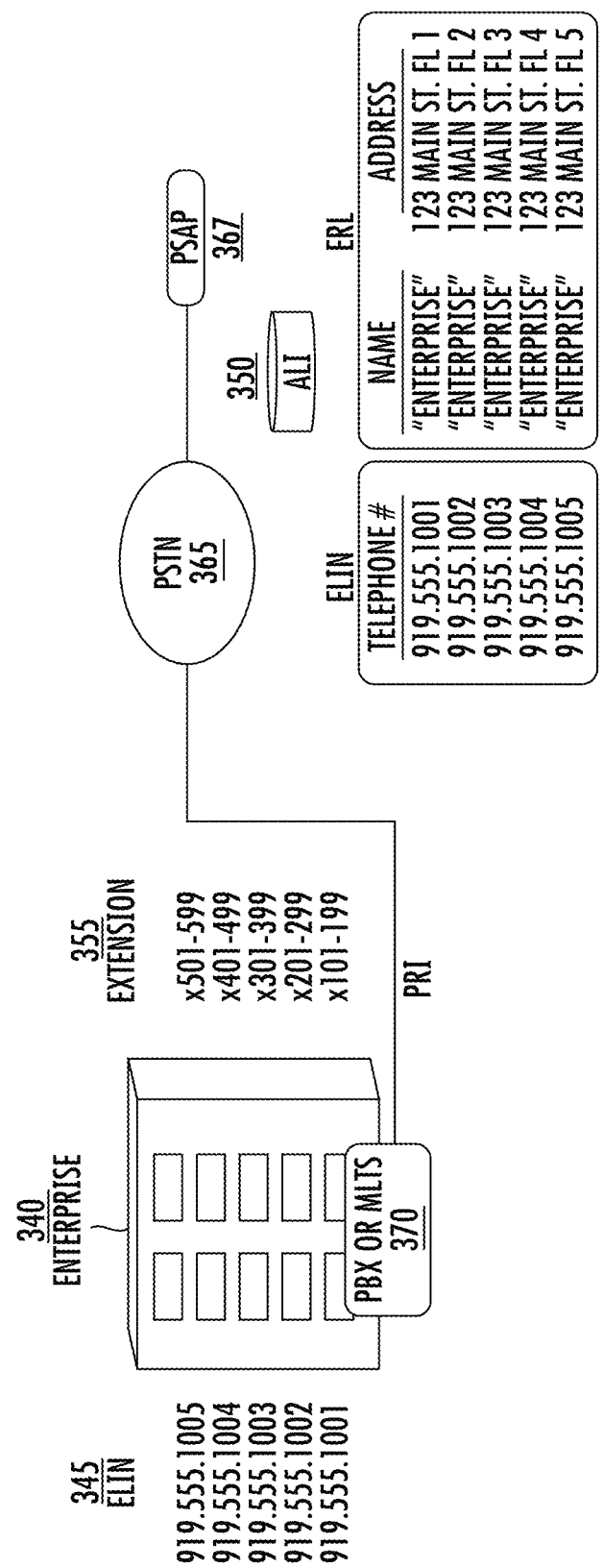
FIGS. 3A and 3B are diagrams illustrating the functionality of ELIN/ERL systems.

The ELIN is simply a 10-digit NANP number and the ERL is an address that identifies floor-level or room-level location (e.g. 123 Main Street, 3rd floor). FIG. 3A illustrates the provisioning of an ELIN/ERL method for a five-story enterprise building 340 with 100 telephone extensions 355 on each floor. Referring to FIG. 3A, the list of extensions 355 are shown on the right side of the building 340 and the ELIN 345 or each floor of the building 340 are shown on the left side of the building 340.

Figure 3B:
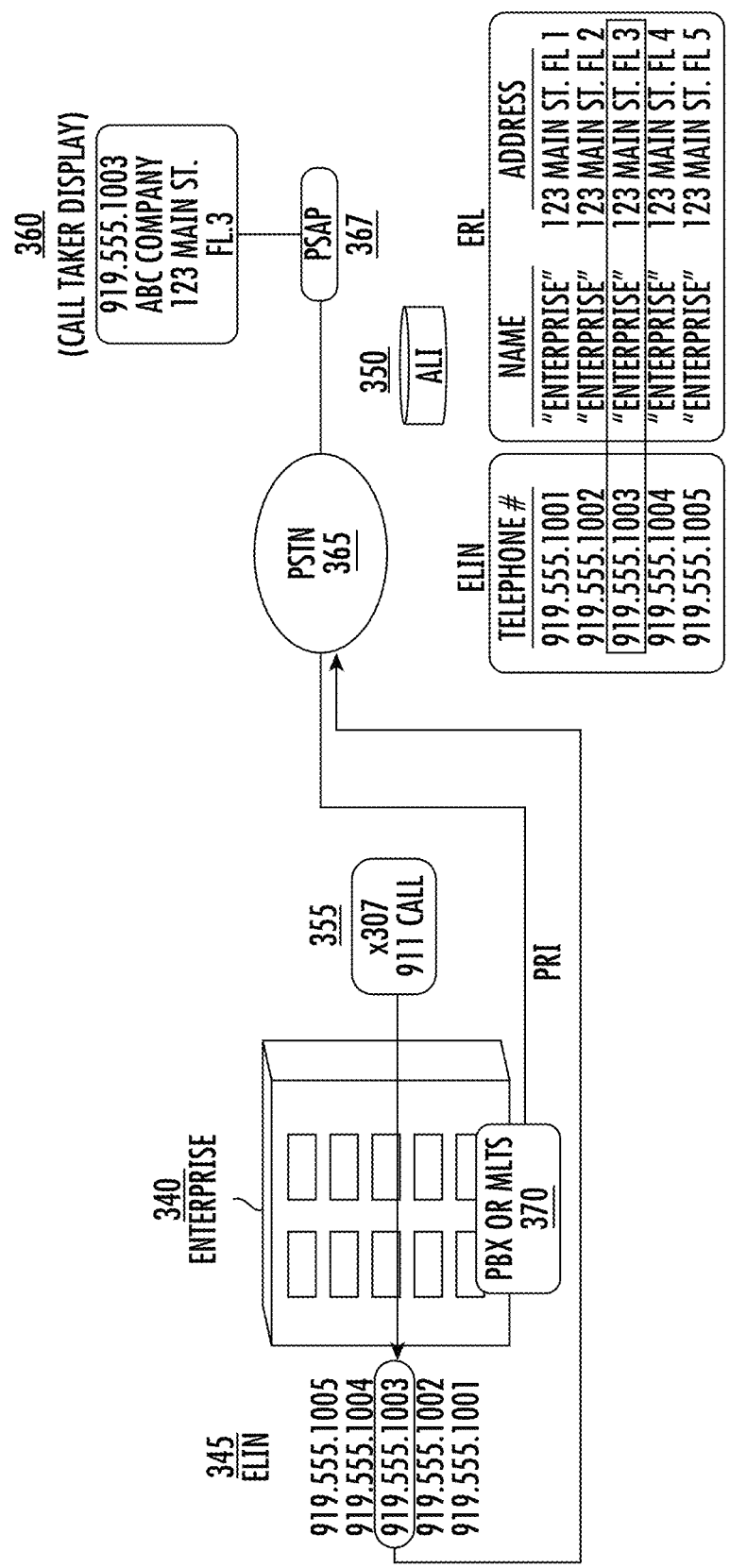

As illustrated in FIG. 3B, each of the five ELIN numbers 345 are then registered into the 911 Automatic Location Identification database (ALI) database. As shown, each ELIN is paired with the ERL address value that contains both the street address of the enterprise, such as "123 Main Str.," as well as the particular floor that each ELIN will service.

With this provisioning in place, all extensions 355 within the enterprise 340 can make 911 calls and the enterprise civic address as well as floor-level information will be displayed to the 911 Call Taker display 360. Each time an extension 355 makes a 911 call, the ANI (Calling Line ID) of the outbound 911 call will be populated with the ELIN for the floor of the building that the extension is located upon. When the 911 call arrives at the public safety answering point (PSAP) 367, the ELIN value is used to look-up the associated ERL address information in the ALI database. The ALI database is the repository of name-number-address data to be displayed to the 911 Call Taker during a 911 call from a particular telephone number.

For example, as illustrated in FIG. 3B, the extension 307 initiates a 911 call. This extension is located on the third (3rd) floor of the building enterprise 340. The MLTS system 370 selects the ELIN value 919-555-1003 to populate the ANI (calling line ID) of the outbound 911 call. When that call arrives at the PSAP 367 after traveling through the public switched telephone network (PTSN) 365, the matching ERL address value of "123 Main Str., FL-3" is looked up in the ALI database 350. This correct floor-level information is then displayed on the 911 Call Taker screen 360.

The use of the ELIN/ERL also allows non-direct inward dialing (DID) extensions can have floor-level or even room-level information properly displayed to Public Safety. Furthermore, individual TNs (DIDs) do not need individual 911 records in the ALI database with their own name-number-address information. This results in both direct cost savings and may also help reduce applicable 911 taxes and surcharges. Furthermore, if a phone/device is relocated to a different floor, the MLTS system 370 detects the new location of the device and, for a new 911 call from that device, uses the ELIN for the new location as the ANI of the 911 call. Phones/devices can move around "behind" the MLTS system 370 and the MLTS system 370 can select the correct ELIN for each device at 911 call time. For example, the phone with extension "307" can be moved from the 3rd floor and plugged in on the $4^{th}$ floor, and the correct floor level location will be provided to Public Safety. This is because the ELIN from the $4^{th}$ floor will automatically be used (despite the value of "x307" now oddly appearing among other lines with extension values in the 400 s).

The MLTS system 370 can also facilitate "911 call back" to the extension that dialed 911. For example, if a 911 call is dropped for any reason, the 911 Call Taker may elect to call back the individual who needs assistance. This may be done by performing a normal telephone call to the number being displayed on the 911 Call Taker screen 360—in the example above this would be the value 919-555-1003 used by extension #307. When the MLTS system 370 receives an in-bound call to the ELIN 919-555-1003, it checks what phone/device was the most recent device to have made a call using that ELN. Since the extension was #307, the MLTS connects the inbound call to extension #307 and rings that phone. Correctly treating call-back calls is an important part of MLTS and ELIN/ERL solutions.

As discussed, the MLTS system can group many phone devices together under the ELIN/ERL technique to facilitate emergency calling. If a phone device is transferred from one floor to another floor in the preceding example, the MLTS system simply uses the "floor correct" ELIN for the device that has moved thereby ensuring that a future emergency call is displayed to the PSAP with the correct floor-level information. However, the ELIN/ERL method discussed above is intrinsically "local" in its context. In other words, there is no concept of an outside phone/device, for example, an international phone device, somehow attaching to the MLTS system and making an emergency call. Accordingly, embodiments of the present inventive concept address the internationalization of the ELIN/ERL method discussed above.

In particular, some embodiments of the present inventive concept enable a VOIP Customer Switch to send an emergency call (e.g. 911 and/or 112) and include a Presence Information Data Format—Location (PIDF-Lo) address within the SIP Invite, for both United States addresses and foreign addresses. This address is then used to determine the correct destination PSAP which can service the emergency call as well as pass that address data onto the PSAP call-taker display. Embodiments of the present inventive concept enable a VOIP Customer to build semi-nomadic VOIP services where the SIP User Agent devices can move from place to place, city to city, and country to country (including the United States) and, in the event of an emergency call, the user's current location (address) will be used to route and process the emergency call. It will be understood that the normal basis of 112 emergency call in Europe does not provide for an "address of the moment" to be used or passed to public safety. Thus, the present inventive concept overcomes this fundamental limitation of 112 calling and provides for "112 semi-nomadic calling" through the use of SIP PIDF-Lo including such use by VOIP devices with United States based TNs.

Although embodiments of the present inventive concept discuss the use of SIP PIDF-Lo as a means to transmit current location (address) information, embodiments are not limited to PIDF-Lo (address) location-by-value. For example, some embodiments may use location-by-reference and SIP Geolocation Header or proprietary SIP xHeader methods without departing from the scope of the present inventive concept. Thus, the use of PIDF-Lo terminology is for example only and not limiting.

As used herein, "semi-nomadic" refers to the ability for a softphone to move within a set of many known addresses (and be able to make a 911 or 112 call correctly). For example, a softphone on a tablet that can move from floor to floor in a building or from building to building on a campus. Embodiments of the present inventive concept allow the user of a device to move seamlessly between one "nominal" address and many "shared" addresses. "Semi-nomadic" indicates that movement is allowed between previously known addresses. This is distinct from "fully nomadic" which allows movement between any arbitrary place to any other arbitrary place with no pre-designation of known address locations.

"Shared Address" refers to an address in an enterprise campus that is the current location or potential location of multiple users. A campus or enterprise could have a set of shared addresses for the floor of one building, multiple buildings in the same city or even multiple groups of buildings in several countries. "Nominal Address" refers to a location where a user most often resides. Despite being semi-nomadic the nominal address is often a work-from-home address of a very specific address down to the room designation. A nominal address for a United States TN must be a United States address. A nominal address of a foreign TN must be an address of that country as specified by the country code in the E.164 format of the TN.

"Proxy Number" refers to a unique telephone number that is associated with a unique shared address. Each unique proxy number-address pair is stored in the ALI database and is "country-correct" based on the country code of the proxy TN. "Proxy Routing" refers to the process of substituting a proxy number for a user's number to stimulate the presentation of a shared address to the PSAP. Proxy routing allows for a VOIP device to make an emergency call upon a foreign network even though the TN of the device is not "country code correct."

A VOIP Customer can purchase telephone numbers (TN) from an INTL VOIP Carrier or port TNs into the INTL VOIP Carrier. Once purchased, each TN can be provisioned with a "nominal" address, i.e., the default or normal location of the device that is used for calling, for example, a specific office address or a work-from-home address. The INTL VOIP Carrier then provisions the TN and nominal address with the appropriate downstream ALI database for use during future 911/112 emergency calls. When the Customer's VOIP Switch receives an emergency call from a user, that call can be passed to the INTL VOIP Carrier as a normal SIP Invite with a TO value of "911" (for the United States) or "112" (for other international countries) and a FROM value of the TN. Normal 911 and/or 112 call processing may then take place. In other words, roaming callers will experience the "customary" 911 and/or 112 service that is generally provided when purchasing TNs from an INTL VOIP Carrier.

Furthermore, some embodiments of the present inventive concept enable a VOIP Customer to utilize a semi-nomadic and international emergency calling service. For this service, in addition to provisioning a single nominal address for each TN, an unlimited amount of "shared" addresses may be provisioned with INTL VOIP Carrier. For example, the VOIP customer may require phone service on a university campus and purchase 1,000 TNs from the INTL VOIP Carrier. These TNs have an emergency calling obligation and the customer meets the obligation by collecting a set of nominal addresses, either office or work-from-home, for all 1,000 numbers. Additionally, the customer observes that there are 25 buildings on campus with five floors each as well as some classroom facilities-they observe that there are 200 additional "shared" addresses where any of the users could visit as they migrate around the campus. The customer elects to purchase 200 additional shared address records for use by the present inventive concept used by the INTL VOIP Carrier. Thus, all 1,000 users can migrate between their designated nominal address and any of the 200 shared addresses of the campus.

Thus, when a user makes an emergency call, the Customer's VOIP Switch sends the INTL VOIP Carrier a SIP Invite with the TO field containing "911" or "112" and the FROM field containing the users TN as well as the PIDF-Lo address of the current location of the user. The PIDF-Lo contains the content of either the users nominal address or any of the 200 shared addresses. The emergency call will be "address-correct" and processed by the INTL Carrier and delivered to the destination PSAP.

There are two key processes that enable embodiments of the present inventive concept. The first is the responsibility of the VOIP Customer and is the process of identifying the current location of the user at the time of the emergency call. The most common design is for the customer to collect a set of location data from the enterprise campus that consists of the subnets or Wi-Fi access points that service a particular floor of a building or large room, such as a lecture hall. For each such subnet or Wi-Fi "location" the customer identifies the specific civic address that is associated with that location. At the time of the emergency call, the Customer's VOIP Switch and SIP User Agents observe the serving subnet or Wi-Fi access point in order to select the correct PIDF-Lo address to send within the SIP INVITE of the emergency call. This allows an end user to move from building to building (subnet to subnet) or floor to floor (Wi-Fi hotspot to Wi-Fi hotspot) and the current location can be sent as PIDF-Lo during an emergency call.

The second process that enables embodiments of the present inventive concept is performed by the INTL VOIP Carrier. For each shared address, the INTL VOIP Carrier selects a unique proxy TN to permanently associate with that shared address. Using this proxy-TN and address pair, the INTL VOIP Carrier can then create a new ALI record for each unique shared address. When an emergency call is received from a user's TN with a PIDF-Lo address, the address is inspected to see if it is the user's nominal address or one of the many shared addresses supported for this enterprise customer. If the PIDF-Lo address is the user's nominal address, then the emergency call is sent to the PSAP with the Calling Line ID ("FROM" field) of the user's TN. This will stimulate the PSAP to display the user's work-from-home address (for example). However, if the PIDF-Lo address is a shared address, then the emergency call is sent to the PSAP with the Calling Line ID ("FROM" field) of the proxy-TN of the shared address. This will stimulate the PSAP to display the shared address of where the caller is at the moment of the call (based on subnet or Wi-Fi location, for example).

If a completed emergency call ends (for any reason) and the PSAP call taker desires to call the user back, the PSAP call taker uses the TN that is displayed on their screen. This TN will either be the user's unique TN (in the case of a call from the nominal address) or one of the proxy-TNs used for a shared address. If the PSAP call taker calls back to a proxy-TN, the INTL VOIP Carrier in accordance with some embodiments of the present inventive concept will forward that call-back call to the appropriate user TN who most recently made an emergency call from that shared location using that proxy TN. For shared locations with many users, multiple proxy-TNs may be used.

Thus, a VOIP Customer of the INTL VOIP Carrier can build a fully "semi-nomadic" emergency calling experience for their employees or phone users. It will be understood that the campuses of a VOIP Customer can be in both the United States and additional countries, for example, Germany and France. The TNs that are acquired for use by the VOIP Customer can be from the United States, Germany and/or France. When a United States based TN is making a call from a United States based campus location citing a shared address, then a United States proxy TN will be used to stimulate the PSAP to display the correct United States campus address. Should the United States user with a United States TN travel to a German or French portion of the customer's campus, then the appropriate German proxy number for a German shared address would be used in accordance with embodiments of the present inventive concept to direct the emergency call to the correct German PSAP and display the correct German campus address. A German user's German TN can likewise roam to a United States campus of the customer for similar treatment. Accordingly, embodiments of the present inventive concept facilitate a full international VOIP emergency calling process that is address-correct despite the user's TN being of a differing nationality than the current locality would normally support as will be discussed further herein.

Figure 4:
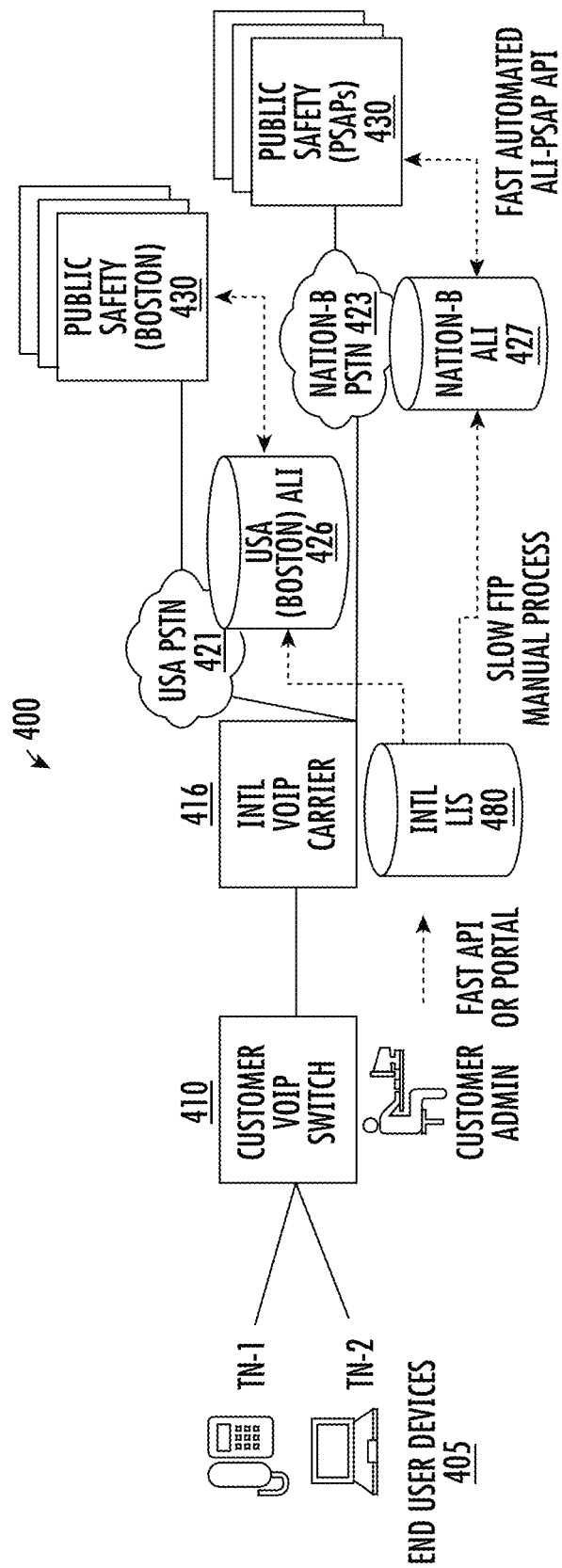
FIG. 4 is basic block diagram illustrating a roaming VOIP 911 call made from a roaming device in accordance with some embodiments of the present inventive concept.

Referring now to FIG. 4, an example of E-DLR in accordance with some embodiments of the present inventive concept will be discussed. Embodiments of the present inventive concept support a VOIP Customer who purchases VOIP services from an International VOIP Carrier for both United States-based and foreign-based subscribers and allows the United States-based subscribers to roam to the VOIP Customer's foreign office premises where, in the case of an emergency, the United States-based subscriber can perform "location-correct" emergency calling. Additionally, the embodiments of the present inventive concept support foreign-to-foreign roaming with location-correct emergency calling and foreign-to-United States roaming with location-correct emergency calling.

Referring FIG. 4, a system 400 in accordance with some embodiments of the present inventive concept will be discussed. As illustrated in FIG. 4, the system 400 includes one or more end user devices 405, a customer VOIP switch 410, an international VOIP carrier 416, a United States PSTN 421 with an associated United States ALI database 426, a Nation-B PSTN 423 and associated Nation-B ALI database 427 and one or more PSAPs 430. It will be understood that FIG. 4 is provided as an example only and embodiments of the present inventive concept are not limited thereto. For example, although a USA PSTN and Nation-B PSTN are illustrated, any two different nations may be represented without departing from the scope of the present inventive concept.

The end user devices 405 may be any phone/device supported for in-bound and out-bound calling on the Customer's VOIP switch 410. Embodiments of the present inventive concept may be applicable to "fixed" devices, where only the provisioned nominal address is used and nomadic devices, such as SIP User Agent Devices which are identified by a dedicated TN. The Customer VOIP Switch is configured to include PIDF-Lo (address) content with each emergency call. The PIDF-Lo contains the current location of the calling user. The address content indicates a United States address when the user is at a United States location and a foreign address when the user is roaming internationally.

An International VOIP Carrier 416 is a multi-national VOIP service provider that can provide access to the US-based TNs as well as TNs in other nations for in-bound calling, out-bound calling, international calling and emergency calling, among other services. The Customer VOIP switch 410 connects to the INTL VOIP Carrier 416 via one or more SIP Trunks in one or more nations and can arbitrarily use any of the connected SIP trunks for calling. The INTL VOIP Carrier 416 connects the customer to the rest of the telecommunications community via the United States PSTN 421 and other nation's PSTNs 423 as needed for full multi-national coverage. The INTL VOIP Carrier 416 can receive emergency calls with PIDF-Lo of the current location of each user and route each user's emergency call to the correct destination PSAP 130 based on the PDIF-Lo (address) content regardless of the national or international roaming state of the user (i.e., a United States caller can receive correct emergency calling when roaming onto the Customer's VOIP Switch in Spain, for example.) It will be understood that each country has its own PSTN. The PSAPis legally authorized receive of emergency traffic for a particular region of a country.

As discussed above, prior to an emergency call being successfully made, certain provisioning must take place. For each calling device (TN) being served, an "endpoint" record 490 (FIG. 5) is loaded into the customer's account with the INTL VOIP Carrier. Each endpoint record contains a unique TN (E.164 value). Endpoint records can be created for United States TNs as well as other nation's TNs. In some embodiments, a default nominal address can be provisioned for the endpoint record. The nominal address must be consistent with the Country Code of the E.164 value. For example, a United States TN would have a United States nominal address. Furthermore, additional data can be provisioned. For example, a preferred language indicator is often used internationally.

Similarly, for each civic address, a "geolocation" record 491 (FIG. 5) is created and stored within the customer's account. The endpoint record 490 and the geolocation record 491 is stored in the Location Information Service (LIS) database 480. For each shared civic address that can be used for an emergency call by any user in a common location, a geolocation record is created. For each geolocation record that is created, it must be designated as either a nominal address (for a given unique TN) or shared address (with no given unique TN). For each shared geolocation record, the INTL VOIP Carrier 416 internally assigns a unique proxy number that is country code correct for the given shared civic address. For shared addresses that may be accessed by a very large group of endpoints, such as an auditorium, the geolocation record may contain a "pool" of proxy numbers. This allows for multiple callers to use the shared geolocation record at the same time without compromising call-back uniqueness. For each nominal geolocation record, records the TN of the endpoint record of the unique TN to which it is associated. It will be understood that it is possible for two geolocation records to exist with matching address content. One is a nominal address and used only for a specific user's TN while the other may be a shared address and used by any caller making reference to the shared address.

Figure 5:
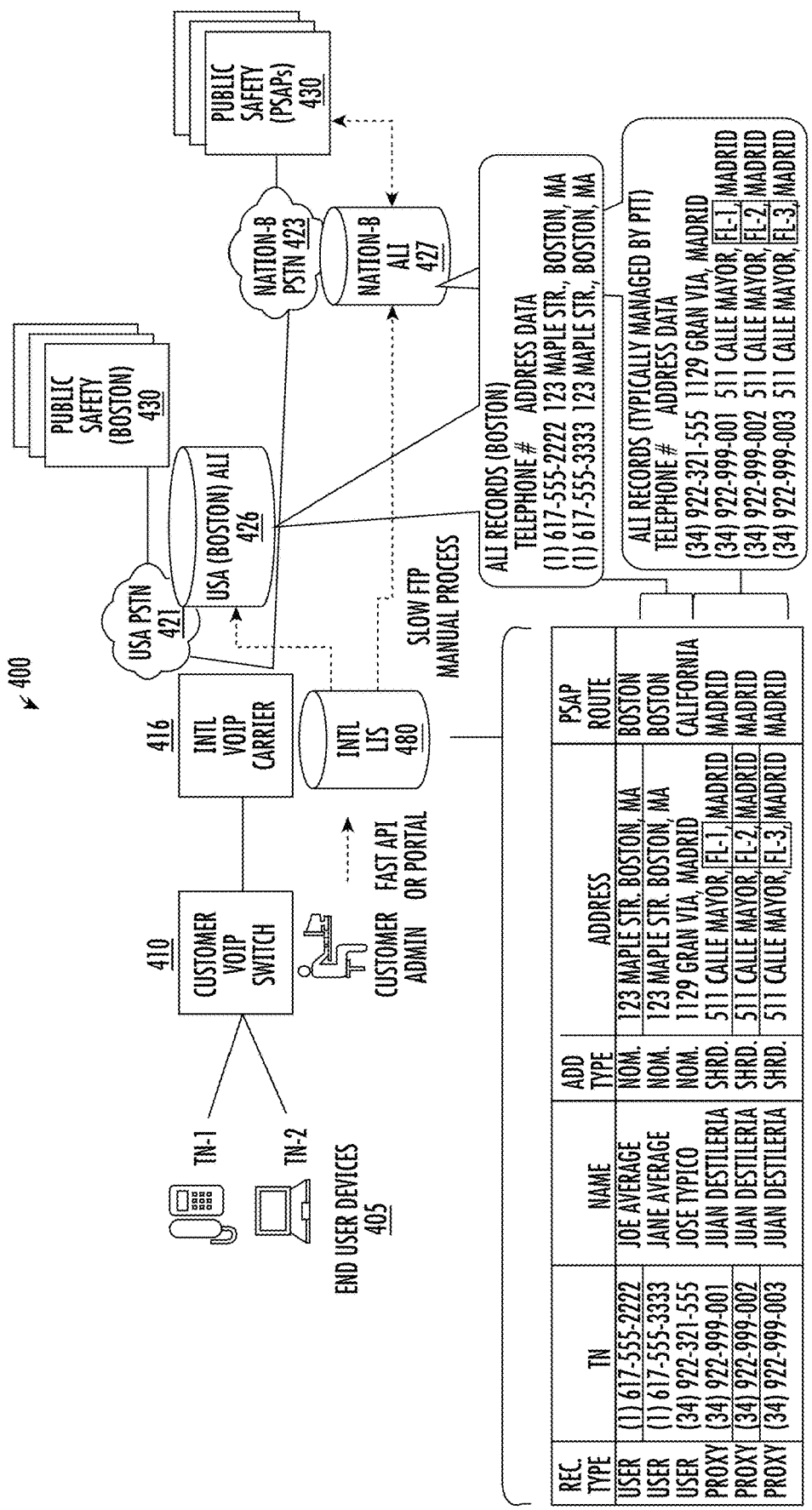
FIG. 5 is a block diagram illustrating provisioning of a system to allow roaming in accordance with some embodiments of the present inventive concept.

Referring now to FIG. 5, provisioning in accordance with some embodiments of the present inventive concept will be discussed. As illustrated, the data for a United States user with the TN value of 1-617-555-2222 includes the user's name (Joe Average), and a nominal address of 123 Maple Str., Boston, United States. In some embodiments, this data may be provided by the Customer via a provisioning interface and the data is processed and stored as one endpoint record 490 and one geolocation record 491 with the INLT VOIP Carrier's LIS 480. The data comprised of the TN and address is also provisioned into the United States (e.g. Boston) ALI 426. At the time of a future 112 call, if the user (Joe Average) calls 911 from his device, the call would proceed to the PSAP with the call identifier of 1-617-555-2222 so that the correct address is displayed: 123 Maple Str., Boston, United States.

Further, the Customer can also facilitate the roaming of the user, Joe Average, to the Customer's business facilities overseas. This user (Joe Average) could also make use of shared addresses for the purposes of emergency calling when outside of the United States. FIG. 5 further illustrates three addresses for each floor of the Juan Destileria at 511 Calle Mayor, Madrid, Spain. These three addresses are stored within the INTL VOIP Carrier's LIS 480 as three geolocation records for each floor of the Customer's building. Each of these three geolocation records are comprised of a unique proxy-TN and a floor-level address where the proxy-TN is country-code correct for the location of the shared civic address, which is in Madrid, Spain. These three records are also provisioned into the Spanish national ALI 427.

If the user (Joe Average) travels to the Customer's business in Madrid and makes an emergency call from the second floor (FL-2) of the Juan Destileria, the Customer's VOIP Switch would simply send the user's TN (1-617-555-2222) and the correct PIDF-Lo address (511 Calle Mayor, FL-2, Madrid) to the INTL VOIP Carrier 516. In accordance with embodiments of the present inventive concept, this call will be correctly processed and delivered to the correct Madrid PSAP as discussed below.

Figure 6:
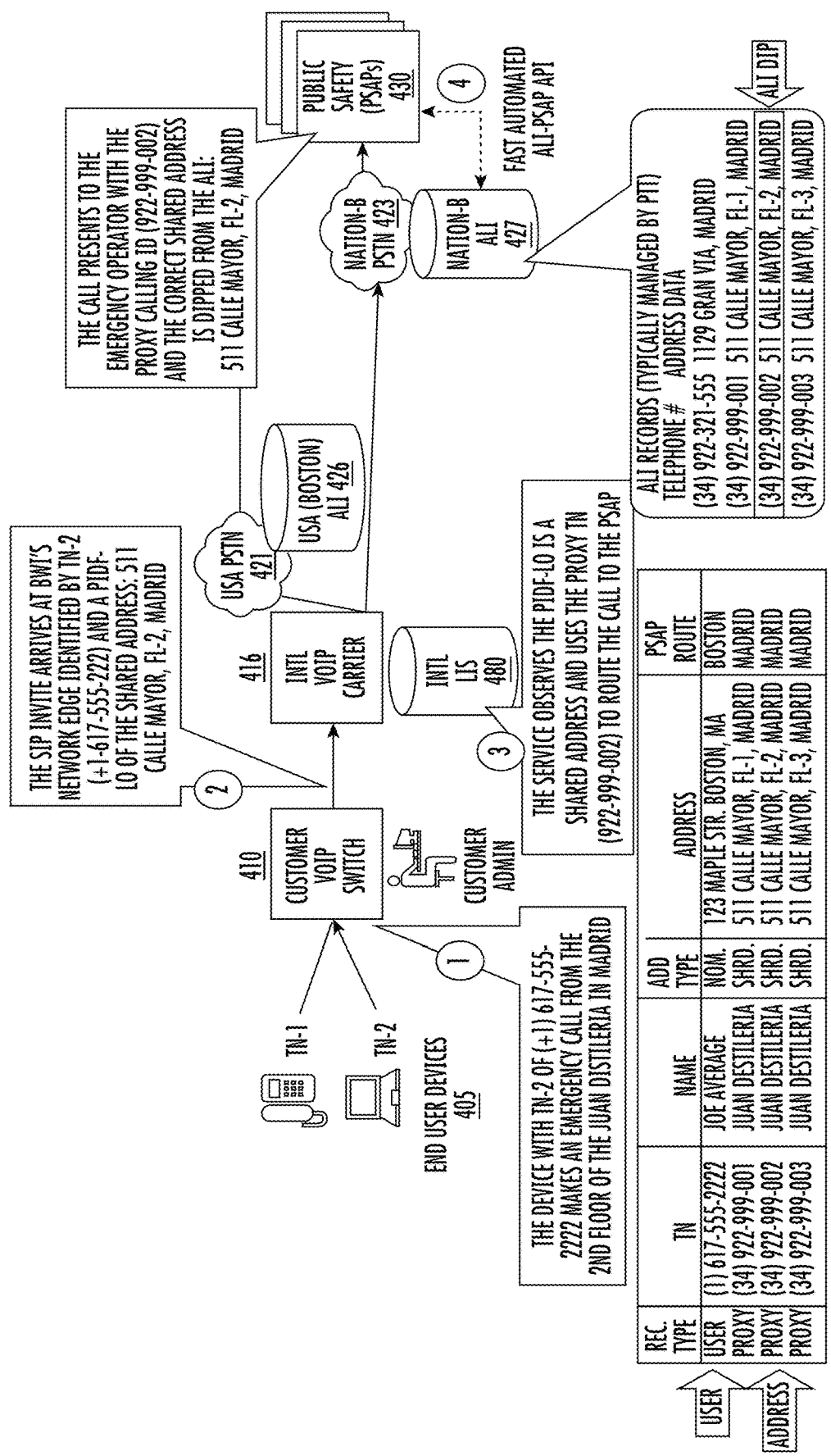
FIG. 6 is a block diagram illustrating an emergency call having a roaming user in accordance with some embodiments of the present inventive concept.

An example of a call made by a user with a United States TN when using a foreign (e.g. Spanish) shared address will be discussed with respect to FIG. 6. Beginning with step 1, a United States device with TN-2 of 1-617-555-2222 makes an emergency call from the 2nd Floor of the Juan Destileria in Madrid. In step 2, the Customer's VOIP switch 410 constructs a SIP INVITE for this emergency call to identify both the user and the current location of the user. To identify the user, the TO filed has a value of TN-2 (1-617-555-2222). The PIDF-Lo of the shared address: 511 Calle Mayor, FL-2, Madrid is also included. This SIP INVITE is sent to the INTL VOIP Carrier 416 network edge on a standard SIP Trunk.

The INTL VOIP Carrier 416 receives the SIP INVITE and observes the PIDF-Lo is a shared address with a proxy TN of 922-999-002. The user's TN-2 (1-617-555-2222) cannot be used to route the call because the national Spanish ALI contains no information for United States telephone numbers. Instead, the proxy TN of 922-999-002 is used to identify the emergency call to the Madrid PSAP 430. Meanwhile, the INTL VOIP Carrier's switch 416 "remembers" that this proxy value was most recently used for user TN-2 because if the PSAP 430 calls this number, that "call-back" call needs to be forwarded to the original caller at 1-617-555-2222.

In step 4, the call is presented to the Emergency Operator with the proxy Calling ID (922-999-002) and the correct shared address is found in the ALI database 427: 511 Calle Mayor, FL-2, Madrid. The correct floor-level information is displayed to the PSAP call taker. It will be understood that this example is using Spanish numbers. If the user flew to Germany and made an emergency call on the same INTL VOIP Carrier 416 account, they could use a shared address from a facility in Germany. The proxy TN will be country code correct for Germany and the call will display properly to the German PSAP. The present inventive concept fundamentally solves roaming issues for both domestic United States nomadic VOIP as well as the international roaming cases.

At some point the emergency call is ended, either intentionally or unintentionally. The PSAP may desire to call the user back for a variety of reasons. When the PSAP desires to make a Call-Back call, if the user's real TN is displayed, there is no special processing. However, for each emergency call that uses a shared endpoint record, any call delivered to the proxy TN is forwarded to the original caller's unique TN. Typically, this forwarding state exists for 24 hours. Some shared addresses with large user bases will have multiple proxy numbers. The call-back will work even if the user has roamed across an international border.

Figure 7:
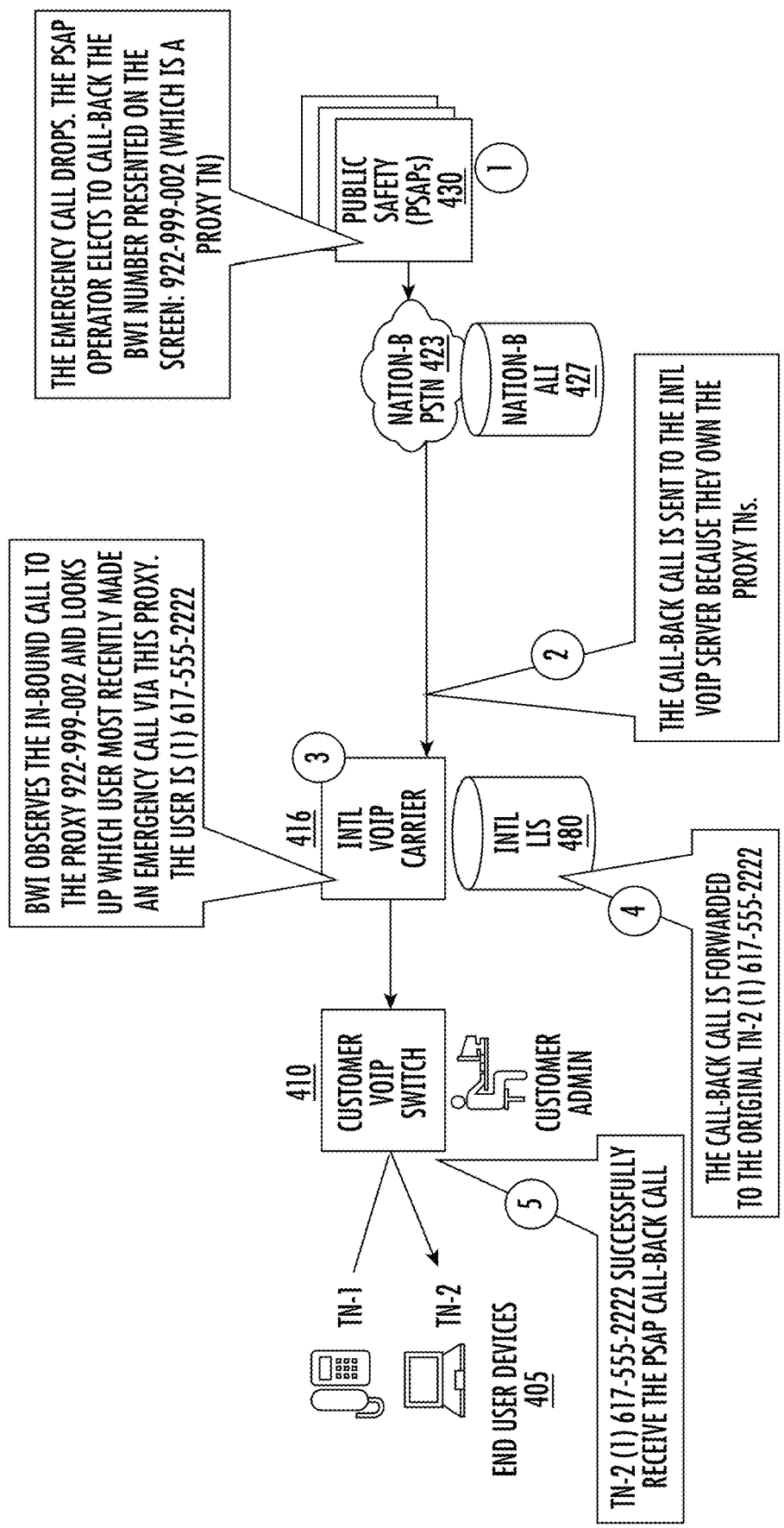
FIG. 7 is a block diagram illustrating a call-back process for a roaming 911 caller in accordance with some embodiments of the present inventive concept.

An example of where a foreign PSAP 430 calls the United States user back at the number displayed on the PSAP screen will be discussed with respect to FIG. 7. As illustrated in step 1, the emergency call drops. The PSAP Operator elects to call back the INTL VOIP Carrier's number presented on the screen: 922-999-002 (which is a proxy TN). In step 2, the call-back call is sent to the INTL VOIP Carrier 416 because it has ownership of the proxy TNs. In step 3, the INTL VOIP Carrier 416 switch observes the in-bound call to the proxy 922-999-002 and looks up which user most recently made an emergency call via this proxy in the LIS 480. The user is 1-617-555-2222. In step 4, the call-back call is forwarded to the original TN-2 (1-617-555-2222). It will be understood that there could be multiple connections to the customer's VOIP switch 410, for example, redundant connections in multiple countries. The call-back route does not have to follow the in-bound path of the original emergency call; rather, the forwarding to the original TN is a completely normal call routing event. Any path to the destination customer switch will work. Finally, in step 5 TN-2 (1-617-555-2222) successfully receives the PSAP call-back call.

Figure 8:
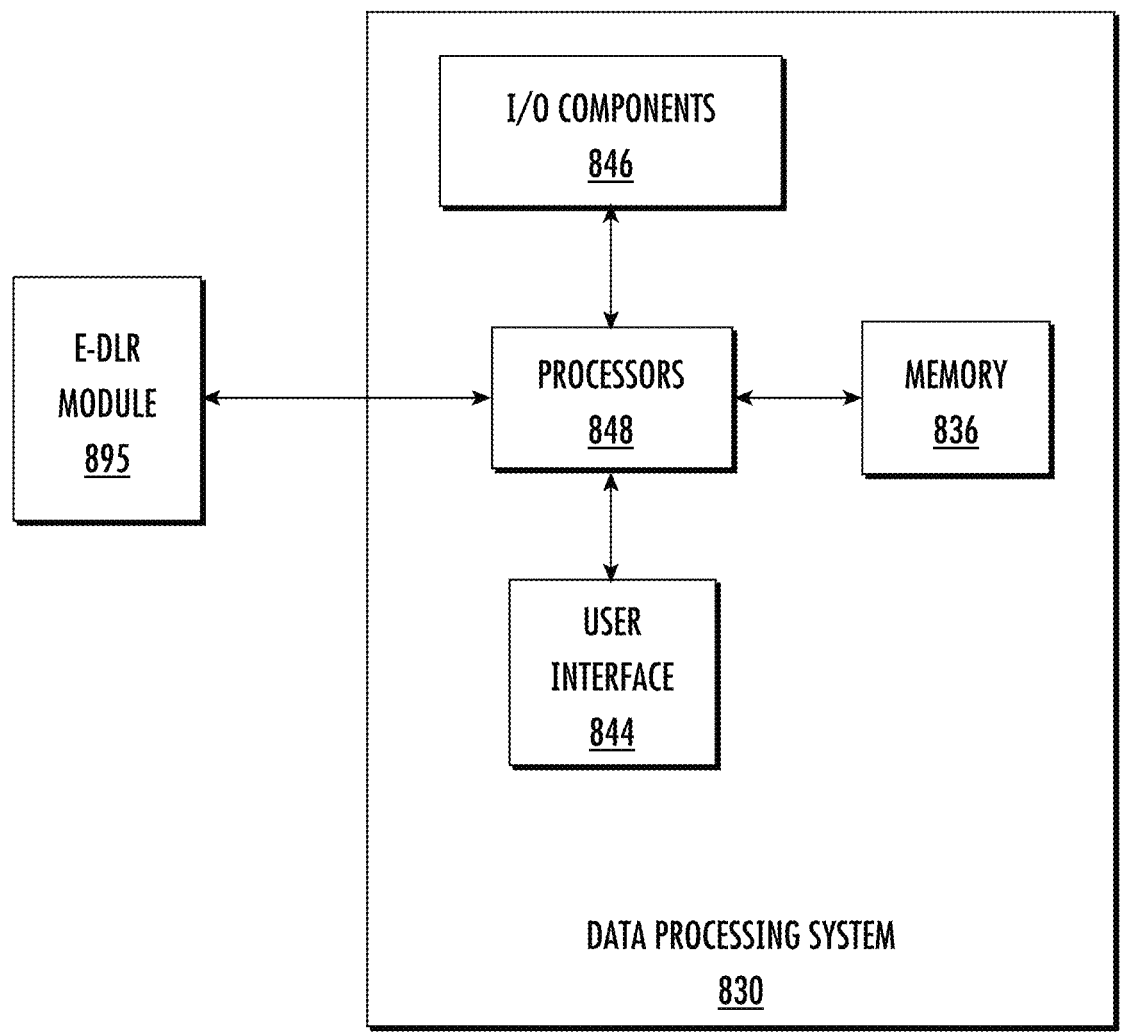
FIG. 8 is a high level block diagram of a data processing system for use with E-DLR in accordance with some embodiments of the present inventive concept.

Referring now to FIG. 8, an example of a data processing system 830 suitable for use with any of the examples described above. Although the example data processing system 830 is shown as in communication with the E-DLR module 895 in accordance with embodiments of the present inventive concept, the data processing system 830 may also be part of the E-DLR module 895 or in any other component of the system without departing from the scope of the present inventive concept. In some examples, the data processing system 830 can be any suitable computing device for performing operations according to the embodiments discussed herein described herein.

As illustrated, the data processing system 830 includes a processor 848 communicatively coupled to I/O components 846, a user interface 844 and a memory 836. The processor 848 can include one or more commercially available processors, embedded processors, secure processors, microprocessors, dual microprocessors, multi-core processors, other multi-processor architectures, another suitable processing device, or any combination of these. The memory 836, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 830.

I/O components 846 may be used to facilitate wired or wireless connections to devices such as one or more displays, game controllers, keyboards, mice, joysticks, cameras, buttons, speakers, microphones and/or other hardware used to input or output data. Memory 836 represents non-volatile storage such as magnetic, optical, or other storage media included in the data processing system and/or coupled to processor 848.

The user interface 844 may include, for example, a keyboard, keypad, touchpad, voice activation circuit, display or the like and the processor 848 may execute program code or instructions stored in memory 836.

It should be appreciated that data processing system 830 may also include additional processors, additional storage, and a computer-readable medium (not shown). The processor(s) 848 may execute additional computer-executable program instructions stored in memory 836. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

E-DLR in accordance with some embodiments of the present inventive concept does not require any changes to the foreign equipment including the PSAP and ALI. The E-DLR method does not require any changes in downstream emergency call processing. Neither the PSAP nor the ALI nor other equipment coincidently involved by the primary telephone network (PTT) needs to change. The PTT is the primary Public Telephone and Telegraph company in a given country, for example, the historical "PTT" in the United States was AT&T. In Europe, examples of incumbent PTT entities include British Telecom in the United Kingdom and Deutsche Telekom in Germany, for example.

E-DLR as discussed herein offers a global nomadic VOIP emergency calling product. Although some conventional systems allow phones to move around a single building or campus, E-DLR dramatically improves performance by moving the entire solution into the cloud thereby providing a pan-global nomadic VOIP emergency calling experience. This global scale has not been done before.

As briefly discussed above, some embodiments of the present inventive concept provide a method where a VoIP user from the United States having a United States TN can roam to a foreign nation and specify a foreign address to be used for a given emergency call. Similarly, a foreign VOIP user can roam to the United States and be enabled to specify their current correct United States address for emergency calling. Thus, the general problem of any-nation to any-nation roaming for VOIP emergency calling is addressed by embodiments discussed herein.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method for Enhanced Dynamic Emergency Location Routing (E-DLR), the method comprising:
receiving a Voice over Internet Protocol (VOIP) emergency call from a roaming emergency caller associated with a first country having an associated telephone number (TN) and an associated address, the VOIP emergency call being made in a second country, different from the first country;
determining that the associated address is a shared address based on information in a geolocation record, wherein the shared address is not a home address associated with the roaming emergency caller;
routing the emergency call from the roaming emergency caller to a public safety answering point (PSAP) associated with the second country using a proxy TN associated with the shared address, wherein receiving is preceded by provisioning TN and address data associated with the roaming emergency caller in a location information service (LIS) associated with a VoIP Carrier and automatic location identification (ALI) databases associated with one or more public switched telephone networks (PSTNs);

receiving the emergency call at the PSAP associated with the second country; and displaying the proxy TN and shared address associated with the proxy TN without use of a VoIP position center (VPC).

2. The method of claim 1, wherein displaying is followed by routing emergency services to the shared address in the second country.

3. The method of claim 1, wherein the roaming caller has a single home (nominal) address and one or more shared addresses associated therewith.

4. The method of claim 1, wherein receiving further comprises receiving a session initiation protocol (SIP) invite including a presence information data format-location (PIDF-Lo) that contains the associated address.

5. The method of claim 4, wherein receiving the SIP invite is preceded by constructing the SIP invite for the emergency call at a VOIP switch associated with a customer to identify the roaming emergency caller and a current location of the caller.

6. The method of claim 1 further comprising:
receiving a call-back call from the PSAP if the VOIP emergency call disconnects;
locating the TN associated with the roaming emergency caller using the proxy TN; and
forwarding the call back call to the TN associated with the roaming emergency caller.

7. A system for Enhanced Dynamic Emergency Location Routing (E-DLR), the system comprising:
a Voice over Internet Protocol (VOIP) 911 server that:
receives a Voice over Internet Protocol (VOIP) emergency call from a roaming emergency caller associated with a first country having an associated telephone number (TN) and an associated address, the VoIP emergency call being made in a second country, different from the first country;
determines that the associated address is a shared address based on information in a geolocation record, wherein the shared address is not a home address associated with the roaming emergency caller;
routes the emergency call from the roaming emergency caller to a public safety answering point (PSAP) associated with the second country using a proxy TN associated with the shared address; and
provisions TN and address data associated with the roaming emergency caller in a location information service (LIS) associated with a VoIP Carrier and automatic location identification (ALI) databases associated with one or more public switched telephone networks (PSTNs); and
a PSAP that:
receives the emergency call at the PSAP associated with the second country; and
displays the proxy TN and shared address associated with the proxy TN without use of a VoIP position center (VPC).

8. The system of claim 7, wherein the PSAP further routes emergency services to the shared address in the second country.

9. The system of claim 7, wherein the roaming caller has a single home (nominal) address and one or more shared addresses associated therewith.

10. The system of claim 7, the VOIP 911 server further receives a session initiation protocol (SIP) invite including a presence information data format-location (PIDF-Lo) that contains the associated address.

11. The system of claim 10, wherein the VOIP 911 server further constructs the SIP invite for the emergency call at a VoIP switch associated with a customer to identify the roaming emergency caller and a current location of the caller.

12. The system of claim 7, wherein the PSAP:
receives a call-back call from the PSAP if the VoIP emergency call disconnects;
locates the TN associated with the roaming emergency caller using the proxy TN; and
forwards the call back call to the TN associated with the roaming emergency caller.

13. At least one machine-readable non-transitory medium comprising a set of instructions executable on a computing device operating as a Voice over Internet Protocol (VOIP) 911 server to cause the computing device to route an emergency call by:
receiving a Voice over Internet Protocol (VOIP) emergency call from a roaming emergency caller associated with a first country having an associated telephone number (TN) and an associated address, the VoIP emergency call being made in a second country, different from the first country;
determining that the associated address is a shared address based on information in a geolocation record, wherein the shared address is not a home address associated with the roaming emergency caller;
routing the emergency call from the roaming emergency caller to a public safety answering point (PSAP) associated with the second country using a proxy TN associated with the shared address; and
provisioning TN and address data associated with the roaming emergency caller in a location information service (LIS) associated with a VoIP Carrier and automatic location identification (ALI) databases associated with one or more public switched telephone networks (PSTNs);
receive the emergency call at the PSAP associated with the second country; and
display the proxy TN and shared address associated with the proxy TN without use of a VoIP position center (VPC).

14. The at least one machine-readable non-transitory medium of claim 13, wherein the computing device is further caused to route emergency services to the shared address in the second country.

15. The at least one machine-readable non-transitory medium of claim 13, wherein the roaming caller has a single home (nominal) address and one or more shared addresses associated therewith.

16. The at least one machine-readable non-transitory medium of claim 13, wherein the computing device is further caused to receive a session initiation protocol (SIP) invite including a presence information data format-location (PIDF-Lo) that contains the associated address.

17. The at least one machine-readable non-transitory medium of claim 16, wherein the computing device is further caused to construct the SIP invite for the emergency call at a VoIP switch associated with a customer to identify the roaming emergency caller and a current location of the caller.

18. The at least one machine-readable non-transitory medium of claim 13, wherein the computing device is further caused to:

receive a call-back call from the PSAP if the VOIP emergency call disconnects;
locate the TN associated with the roaming emergency caller using the proxy TN; and
forward the call back call to the TN associated with the roaming emergency caller.

\* \* \* \* \*